United States Patent [19]

Naito

[11] E Re. 29,208

[45] Reissued May 10, 1977

[54] METHOD AND APPARATUS FOR MANUFACTURING SYNTHETIC RESIN TUBULAR FILM HAVING OCCLUDENT MEANS IN THE INSIDE SURFACE THEREOF

[75] Inventor: Kakuji Naito, Tokyo, Japan

[73] Assignee: Kabushiki Kaisha Seisan Nihon Sha, Tokyo, Japan

[22] Filed: Sept. 30, 1975

[21] Appl. No.: 618,164

Related U.S. Patent Documents

Reissue of:

[64] Patent No.: 3,340,116
Issued: Sept. 5, 1967
Appl. No.: 89,540
Filed: Feb. 15, 1961

[30] Foreign Application Priority Data

| | | |
|---|---|---|
| Apr. 11, 1960 | Japan | 35-21148 |
| Apr. 11, 1960 | Japan | 35-21149 |
| June 3, 1960 | Japan | 35-26770 |

[52] U.S. Cl. ..... 156/91; 24/201 R; 156/198; 156/200; 156/244; 156/251; 156/259; 156/498; 264/95; 425/327; 425/392

[51] Int. Cl.[2] ..... B32B 7/04

[58] Field of Search ..... 156/92, 244, 198, 200, 156/251, 498, 259; 264/95; 24/201 R; 425/327, 342

[56] References Cited

UNITED STATES PATENTS

| | | | |
|---|---|---|---|
| 2,085,973 | 9/1957 | Klasing et al. | 156/251 |
| 2,616,127 | 11/1952 | Pfeiffer et al. | 425/392 |
| 2,668,324 | 2/1954 | Johnson | 425/327 |
| 2,740,740 | 4/1956 | Binnall | 156/251 |
| 2,750,631 | 6/1956 | Johnson | 264/95 |
| 2,762,421 | 9/1956 | Quinche et al. | 156/198 |
| 2,852,813 | 9/1958 | Longstreth | 18/57 |
| 2,955,321 | 10/1960 | Fortner et al. | 18/14 |
| 2,978,748 | 4/1961 | McCauley et al. | 18/14 |

FOREIGN PATENTS OR APPLICATIONS

| | | |
|---|---|---|
| 659,706 | 5/1938 | Germany |

*Primary Examiner*—Edward G. Whitby
*Attorney, Agent, or Firm*—Hill, Gross, Simpson, Van Santen, Steadman, Chiara & Simpson

[57] ABSTRACT

*A method and apparatus for manufacturing a tube to be used for forming plastic reclosable bags including means for extruding a continuous annular tube of plastic with circumferentially spaced axially extending interlocking rib and groove profiles on the surface from a die shaped to form the tube and profiles, means for delivering tube separating air through the die into the tube interior, means for delivering a flow of outside cooling air around the outer surface of the tube to cool the tube at a rate to maintain the profiles on the surface of the tube and drawing means positioned for receicing the tube and drawing it from the die and flattening it.*

13 Claims, 23 Drawing Figures

METHOD AND APPARATUS FOR MANUFACTURING SYNTHETIC RESIN TUBULAR FILM HAVING OCCLUDENT MEANS IN THE INSIDE SURFACE THEREOF

Matter enclosed in heavy brackets [ ] appears in the original patent but forms no part of this reissue specification; matter printed in italics indicates the additions made by reissue.

This invention relates to a method and apparatus for manufacturing bags made of synthetic resin, wherein have been formed integral with the bag material at the inner surface of the bag mouth vis-a-vis each other, a male rib and a female rib (the female rib has a groove therein for interlockingly receiving the male rib) which are provided as to be occlusive with respect to each other. It comprises a method of automatically manufacturing the aforesaid bags by employing an apparatus consisting of means provided with a mold for molding continuously material pressed out by a synthetic resin extruder into a tube in which a male rib and a female rib rises in the inside surface thereof in parallel to its axis, means for air-cooling positively this tubular bag material during its travel, means for pressing this material into a flat belt-like form and maintaining the male and female occludent means in a state wherein proper engagement thereof is maintained and means whereby the aforesaid material is thereafter successively cut one by one into bag width units and simultaneously the cut edges thereof are heat sealed by a heated blade, and by utilizing the speed difference of the conveyor belt the cut edges of the bags are separated apart, and the heat sealed edges are pressed to ensure the airtightness thereof.

An object of this invention is to provide a bag made of synthetic resin wherein the step of adhering to the bag material the male rib and female rib that are used to close the bag mouth by occlusion is obviated, and the appearance of the bags is improved by forming vis-a-vis said male rib and female rib simultaneously with the formation of the bag material and integrally therewith at the inner surface portion of the bag material that is to become the bag mouth.

Another object of the invention is to provide a method of manufacturing efficiently a bag made of synthetic resin and equipped with occludent means by forming continuously a bag material in tubular form, then during its travel air-cooling it positively and pressing it into a flat belt-like form, and thereafter cutting this material with a heated blade successively into the required width while simultaneously heat sealing the cut edges.

A still another object of the invention is to provide for bringing into register accurately the relative positions of the female and male ribs of the individual bags that are produced so as to enable their engagement and separation to be smoothly and perfectly accomplished, this registration being obtained by arranging the tubular bag material preparatory to the cutting and heat sealing by the heated blade in such a fashion that the male and female ribs are maintained in a perfectly occluded state and in this state are gradually flattened.

A further object of the invention is to provide for an enhancement of the airtightness of the bag by ensuring the perfect jointing of that part near the male and female ribs whose perfect adhesion by means of the sealing action alone at the time of cutting can hardly be expected; this being achieved by cutting and heat sealing with a heated blade successively one by one the bag material in bag width and simultaneously by utilizing the difference in speed of the conveyor belt to separate apart the cut portions and thereafter pressing the heat sealed edges of the bags.

A still further object of the invention is to provide an effective method and apparatus capable of manufacturing efficiently a bag made of synthetic resin and equipped with occludent means in the inside surface thereof by carrying out these operations continuously and automatically.

A still further object is to provide for freely regulating the strength of the occludent engagement depending on the use to which the bag is to be put by regulating the amount of resin flowing into the molding groove for forming the occludent ribs by means of the provision of freely adjustable resistance projections at a point below the molding grooves in the extrusion gap.

The bag material is molded into a long continuous tube, which is obtained by extruding from a conventional extruder a synthetic resin under heated state upward through an annular extrusion gap to form continuously a tubular body in which are formed by means of incision-like molding grooves provided in a section of the annular extrusion gap simultaneously in the inner surface thereof raised male and female ribs parallel with the line of generation of the tubular body. Then, in transporting this while clasped in a state of flatness by means of a pair of rolls provided at the top of the apparatus, air is first blown from the aforesaid mold into the tubular bag body to maintain the same in a swelled state between the mold and the aforesaid rolls and by concurrently blowing in cold air uniformly from air inlet pipes surrounding the tubular body against the tubular body maintained in the swelled state the film is cooled uniformly. The tubular body is then guided to the section for engaging the occludent means. However, by inserting and providing, as to reside constantly in the tubular body by its own weight or suitable means, a guide device having grooves which engage respectively the female and male ribs, and by causing the occludent ribs to fit respectively into their guide grooves as to align the two ribs in a position suitable for engagement, and thereafter engaging the two ribs by confining the tubular body from both sides when it advances through the narrow gap in the section for engaging the occludent means, followed by passage through a roll which acts as a pressing as well as a feeding roll, the tubular bag body is secured together in a perfectly occluded state. The bag material which is now flat and maintaining its occluded state can be finished into individual bags by cutting followed by sealing the cut edges. In actual practice, however, owing to the necessity of accomplishing printing of such as trademarks, tradenames, etc. on the bag surface, the bag material that has been formed in a flat and continuous state, as described hereinabove, is first wound up on a reel, transferred to the printing step where after printing it is rewound on the reel and thereafter cut and the cut edges simultaneously sealed. And the apparatus for achieving the above-described results comprises an apparatus in which: The flat belt-like bag material, in which the occludent state is maintained as described hereinabove, is continuously delivered through delivery rollers at a predetermined speed. The forward part of this bag material while being transferred to a conveyor belt whose rate of travel is greater than the delivery speed of the delivery rollers is at this point of transfer heat sealed as well as cut into predetermined widths whereby the bag that has been cut away from the bag material is separated apart from the cut edge of the bag material as a result of the difference in the relative speeds of the delivery rollers and the conveyor belt. This is followed by finishing each of the individual bags by sealing to airtightness the cut edges by pressing the cut edges between a pressure plate and the conveyor belt. However, depending upon the use to which the bag is to be put, the mold may be constructed in which, at a point below the molding grooves for molding the occludent ribs provided in a section of the annular extrusion gap of the mold, communicating passages which communicate with said molding grooves are branched off from said extrusion gap, and near the entrance of the communicating passage resistance projections are provided in the extrusion gap interior such that their positions are freely adjustable from the outside of the mold by means of such as a screw.

The mode of practicing the invention will be described concretely below with reference to the accompanying drawings, in which.

Figure 1:
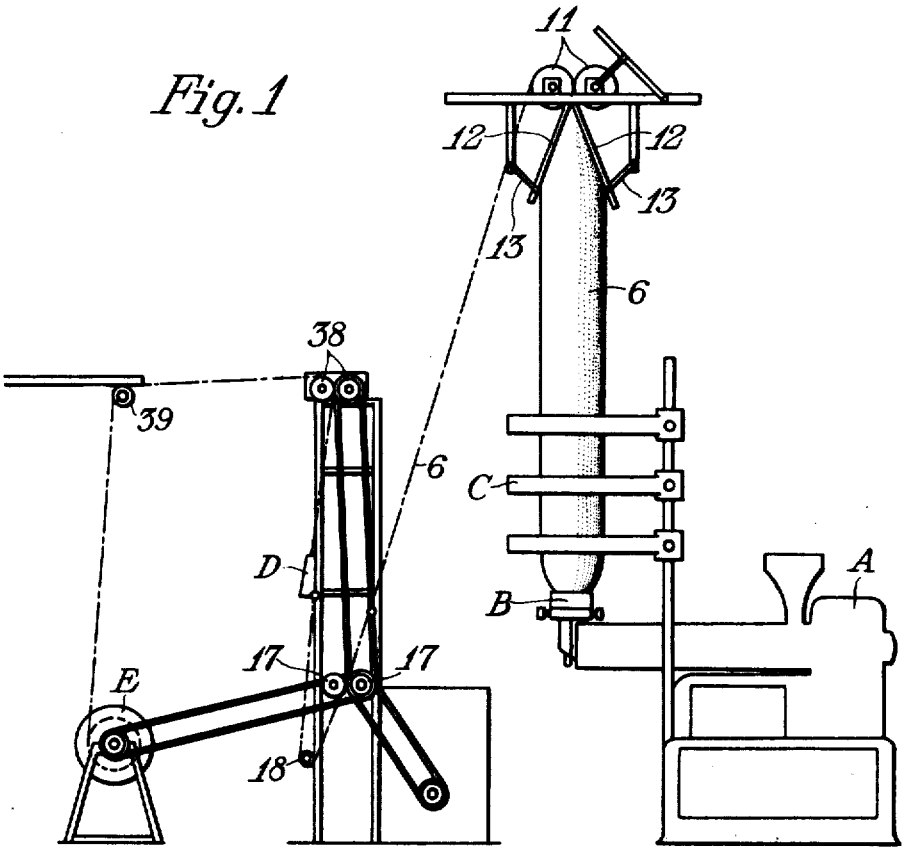
FIG. 1 is a side elevation showing an apparatus which continuously molds a bag material, occludes the male and female ribs thereof and while flattening the same into a flat belt-like shape winds it up.

In FIG. 1, A is the synthetic resin extruder; B, the mold which serves as the extrusion outlet; C, the cold air discharge section; D, the engaging section; and E, the windup reel.

Figure 3:
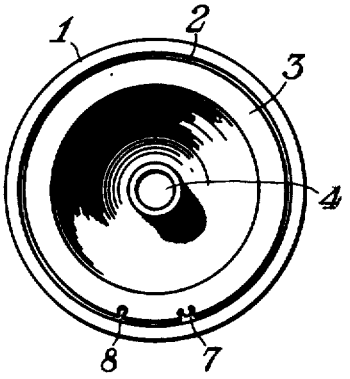
FIG. 3 is a top plan view of a mold section.
Figure 4:
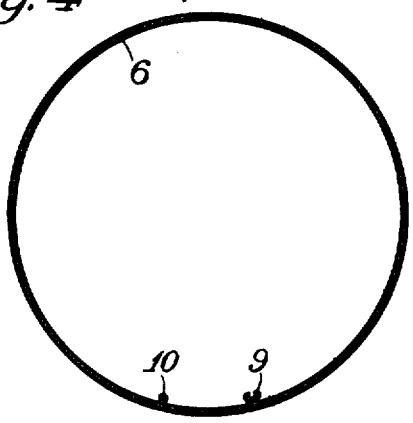
FIG. 4 is a cross-sectional view of the bag material taken along lines X—X of FIG. 2.
Figure 7:
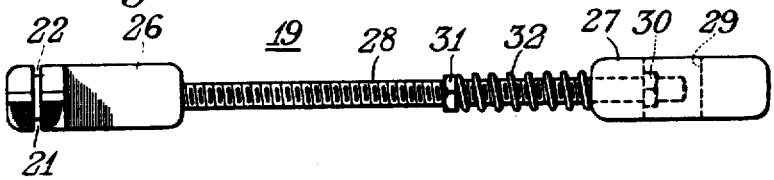
FIG. 7 is a top plan view of the above.
Figure 2:
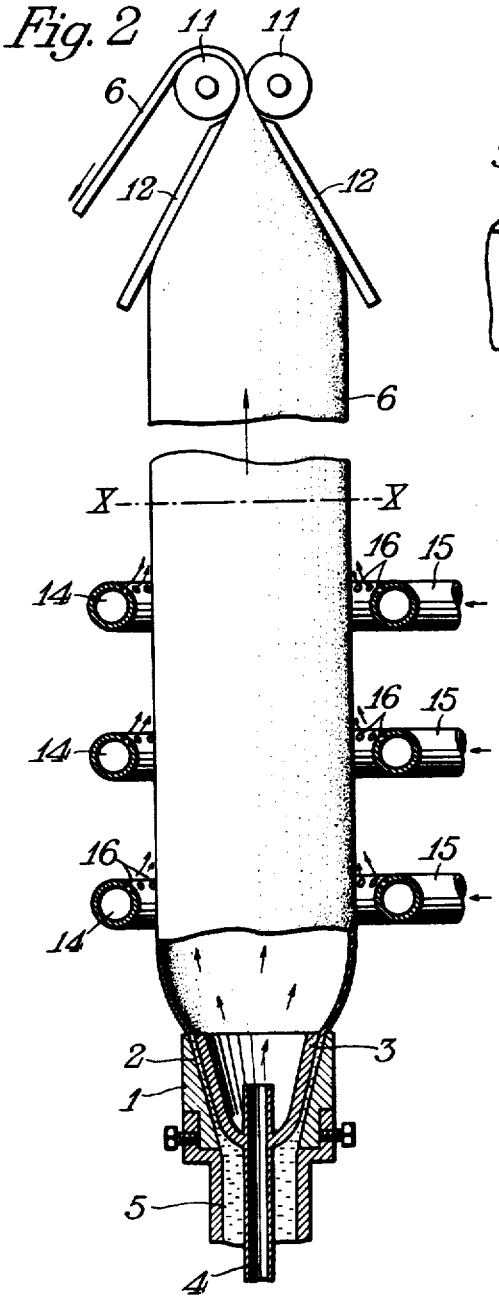
FIG. 2 is a detailed front elevation in section of that section which continuously molds the bag material.
Figure 5:
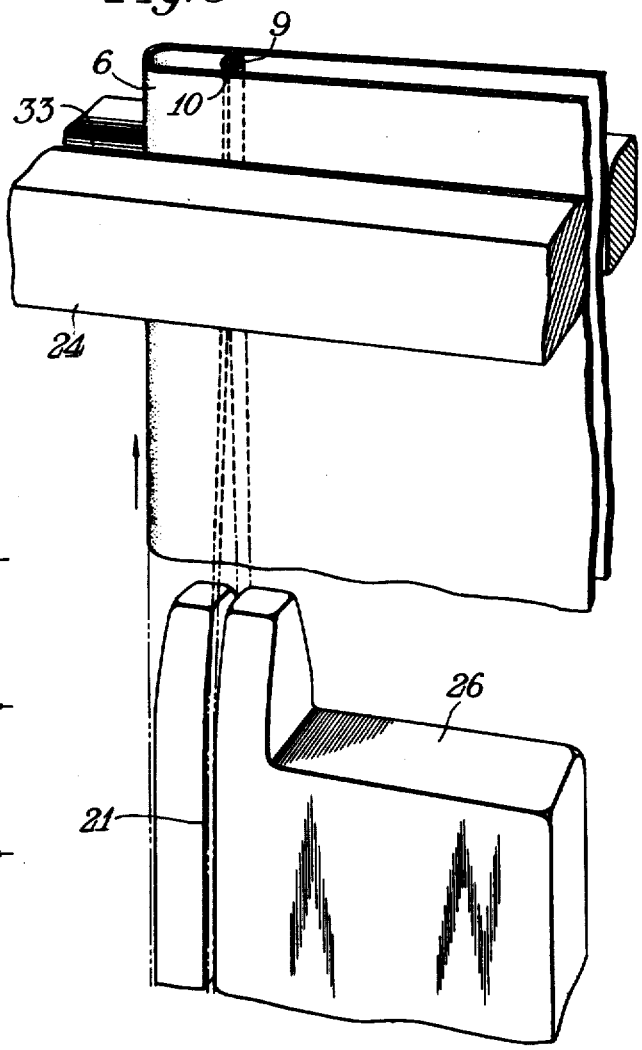
FIG. 5 is an explanatory view showing that section for engaging the occludent means.
Figure 6:
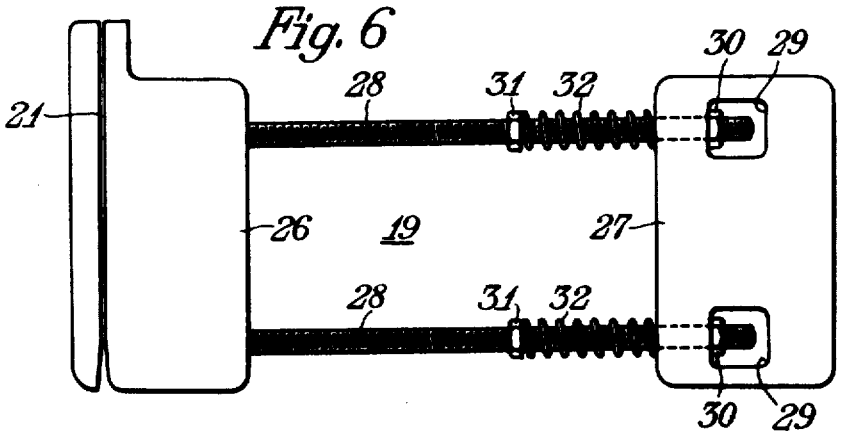
FIG. 6 is a front elevation of a guide for aligning the male and female ribs.

While the extruder A is constituted such that the synthetic resin material is extruded under a heated state, and it is possible to use one that is of a conventional structure, the extrusion outlet which serves as the mold B, as shown in FIG. 2, consists of a combination of an inverted truncated cone-shaped outer mold 1 and a core 3 such that a narrow annular extrusion opening or gap 2 is formed therebetween. In the central bottom part of the core 3, an air inlet tube 4 is provided, while the bottom part of the outer mold 1 constitutes an introductory cavity 5 which communicates with the extruder A from which the synthetic resin is extruded and delivered via said introductory cavity 5 to the aforesaid extrusion gap 2. As shown in FIG. 3, there are formed molding grooves or profiles 7 and 8 in the outer surface of the core 3 communicating with the extrusion gap 2 for forming integrally with the bag body 6 the male and female ribs 9 and 10 for occlusive use.

Directly above this mold B there is provided a pair of delivery or pinch rolls 11, 11 disposed in lateral fashion facing each other for clasping and delivering in a flat state the tubular bag body 6 that is extruded from the mold. And the apparatus is constituted such that, in the meantime, air is blown in small amounts into the tubular bag body 6 from the bottom through the aforesaid air inlet tube 4, and with the top part of the bag body 6 being held together by means of the delivery rolls 11, 11, the bag body 6 is swelled and maintained in a tubular shape. Below the rolls 11, 11 there is provided a pair of guide plates 12, 12 facing each other in roof fashion whereby the shoulder portion of the bag body 6 swelled into a tubular shape is guided and is gradually pressed flat as shown in FIG. 2 and passes between the rolls 11, 11. These guide plates 12, 12 are provided respectively with adjusting rods 13, 13 by which the angle of inclination of these guide plates are controlled.

At that part of the apparatus where the tubular bag body 6 ascends, a cold air discharge section C is provided. As illustrated in FIG. 2, several tier of air supply pipes 14 are provided annularly surrounding the periphery of the tubular bag body 6, and the air is appropriately supplied to the annular pipes 14 from communicating pipes 15 and issues from numerous orifices 16 provided in the inner periphery of each of the air supply pipes 14 is blown against the outer surface of the bag body 6 to remove heat from the freshly molded film and thus cool the same.

Figure 9:
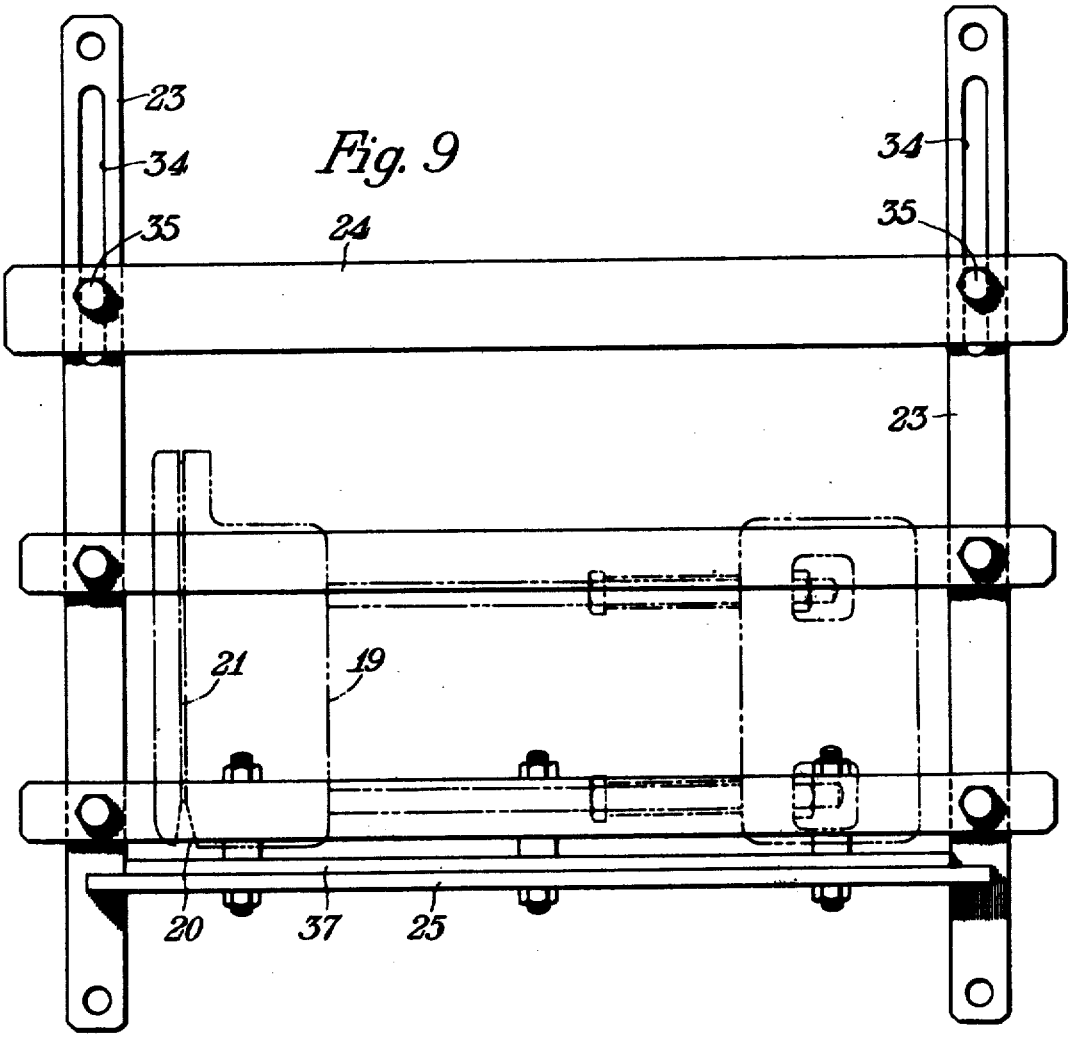
FIG. 9 is a front elevation illustrating the above relationship.
Figure 8:
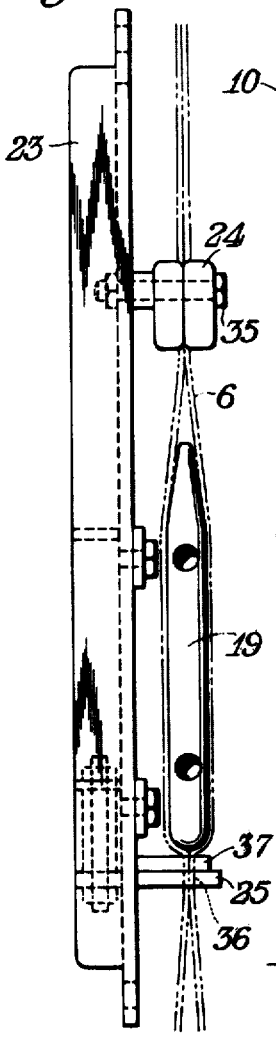
FIG. 8 is a side elevation showing the relationship between the above guide and that section for engaging the occludent means.
Figure 10:
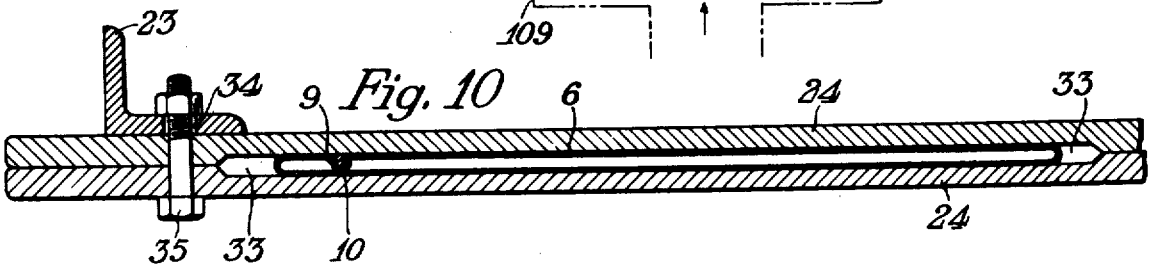
FIG. 10 is a top plan view in section of that section for engaging the occludent ribs.

The bag body 6 which leaves the delivery rolls 11, 11, as shown in FIG. 1, after passing through such as intervening guide rollers 17, 17 and 18 advances upward and is guided to the section for engaging the occludent ribs 9 and 10 which also may be termed rib and groove elements. The female rib has a groove therein for releasably interlockingly receiving the rib element. This section for engaging the occludent ribs D is constituted as shown in FIGS. 8, 9 and 10, and in first passing the end of the bag body 6 through this section, an aligning means or guide 19 is first of all inserted into the mouth of the tube where it is held therein. As is clear from FIGS. 5 to 9, the guide 19 is a device which is relatively flat whose sides are boat-shaped and having guide grooves 21, 22 which extend longitudinally along both sides thereof in the direction of the advance of the bag body wherein the male and female ribs fit in respectively from the wide mouth 20 at the bottom of the guide 19 and travel therealong. If possible, the device preferably should be of suitable weight so that it will reside in the bag body 6 while maintaining to a certain extent its desired position by means of its own weight without hindering however the advance of said bag body 6. However, on account of the fact that the guide 19 is disposed in a position between a pair of engaging plates 24 and a retaining plate 25 mounted to the machine frame 23, even if its own weight is light, when disposed near the engaging plates 24, its position may be maintained in general at its proper place due to its relative position with respect to the engaging plates 24. Furthermore, if necessary, it is also possible to control the position of the guide 19 by providing at a position near its wedge-shaped portion at its top a pair of rollers rotating in an opposite direction to the direction of advance of the bag body 6 and in light contact with the outer surface of said bag body 6. Or alternatively, the utilization of magnetism is another possibility.

While the structure of the guide 19, as illustrated, consists of a combination having at its one end a plate 26 having guide grooves 21, 22 and at the other end a plate 27 connected by a pair of stud bolts 28 having screwed at one of their ends nuts 30 in a passage 29 formed in the latter plate 27 to which the stud bolts have been fitted as to extend therein, and spring 32 are provided on the stud bolts between the plate 27 and another pair of nuts 31 screwed to the middle portion of the stud bolts whereby the distance between the two plates 26 and 27 are regulated so as to adapt the above distance to conform with the width of the bag body 6, this regulating mechanism is not necessarily indispensable to the guide.

The male and female ribs of the bag body 6 are guided to the proper positions by means of the guide grooves 21, 22 of this guide 19 and their positions brought in register. And as the bag body 6 advances, by being pressed from both of its sides as it proceeds through the narrow gap 33 formed between the pair of engaging plates 24, the male and female ribs 9, 10 are made to engage with accuracy. These engaging plates 24 are mounted as to to be easily attachable or detachable by means of bolts 35 in long openings 34 in the machine frame 23. On the other hand, the retaining plate 25 has a long groove 36 just sufficient for the free passage of the flat bag body 6 therethrough, and above said retaining plate a buoyant bed 37 consisting of such as felt or soft rubber for absorbing the shocks should the guide 19 make up-and-down oscillating movements.

Figure 11:
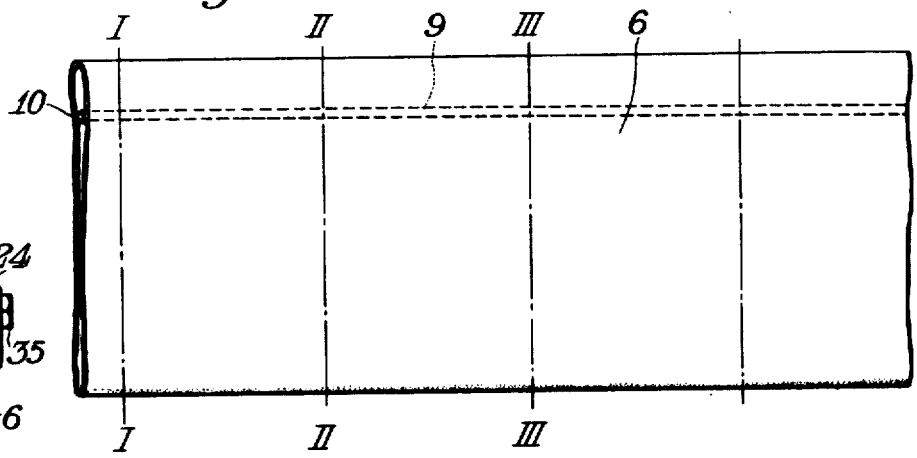
FIG. 11 is a top plan view showing the bag material subsequent to its having been occluded.

Since the bag body 6 which has thus passed through the gap 33 of the engaging plates 24 are flat with their male and female ribs being in positive engagement, it is very convenient as their top and bottom edges can be accurately determined when cut across at the lines such as I—I, II—II and III—III, as shown in FIG. 11. It is also suitable when printing is to be applied to its surface since the misalignment in the print positions will not occur. The bag body 6 thus molded into a flat belt-like shape may be immediately transferred to the bag manufacturing steps to be described hereinafter. In actual practice, however, since in most cases, printing of such as trademarks, trade names, etc., are accomplished, it is perhaps convenient to first wind up the bag material in this state by guiding the same to a windup reel E after passing over, as appropriate, the guide rollers 38, 38 and 39.

Figure 21:
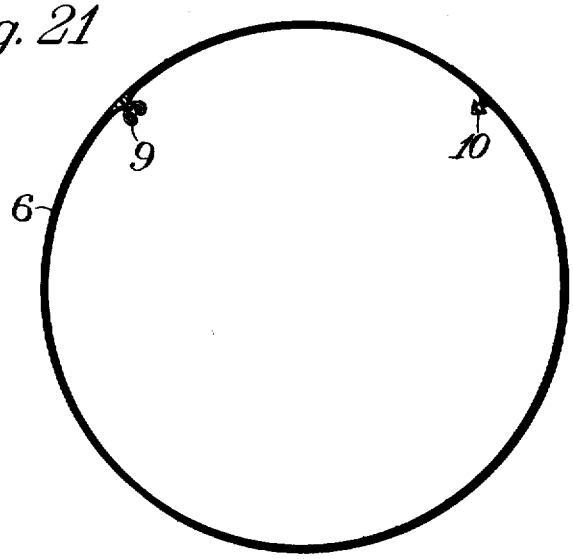
FIG. 21 is an enlarged view in section showing a modification of the occluding ribs.
Figure 22:
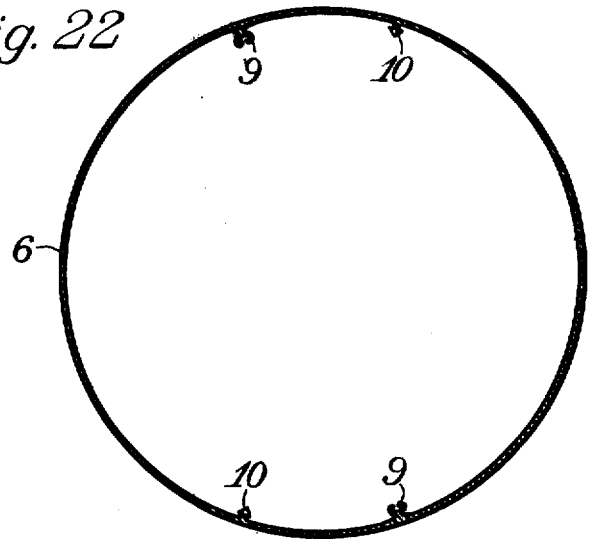
FIG. 22 is a cross-sectional view showing the bag material in which two sets of occluding ribs have been formed.
Figure 23:
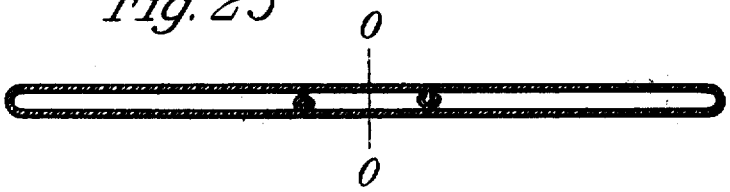
FIG. 23 is a descriptive drawing showing the above bag material in its flattened form and the location where it is to be cut.

In the hereinabove-described apparatus, the cross-sectional shape of the male and female ribs suitable for occlusion of the bag body 6 can be obtained by suitably designing the configuration of the molding grooves 7, 8. The cross-sectional shape of these female and male ribs 9, 10 may be suitably determined in accordance with the uses to which the bags are to be put. For example, as shown in FIG. 21, for a container to be used for fine powders the ribs may be so formed so that the labial section of the female rib 9 is turned inward along the length of the rib while the male rib 10 is formed arrow-headed. In addition, regardless of the shapes of the male and female ribs, when two sets thereof are formed facing each other, as illustrated in FIG. 22, and subsequently cut along line O—O midway between the two when the bag body has been flattened as in FIG. 23, two bags are obtainable at the same time. Needless to say, in this case the guide 19 to be used for occluding the ribs will be provided with guide grooves suitable for guiding the two sets of ribs and simultaneously causing the occlusion thereof.

On account of the fact that the molding grooves 7, 8 branch off from the annular extrusion gap, the passage therethrough of the synthetic resin is at times difficult depending upon the configuration of the grooves. To deal with this difficulty, the apparatus is provided with a resistance projection, which is adjustable from the outside, at a point opposite the lower end of the groove whereby a part of the resin that is extruded is conducted into the molding grooves. By adjusting the aforesaid resistance projection, the amount of resin flowing into the molding grooves is regulated and thus the strength of the occludent ribs, that is, the strength of occlusion is regulated in accordance with the uses to which the bag is to be put. In FIGS. 12 to 17 are illustrated the mold in which has been provided this adjustment means.

Figure 12:
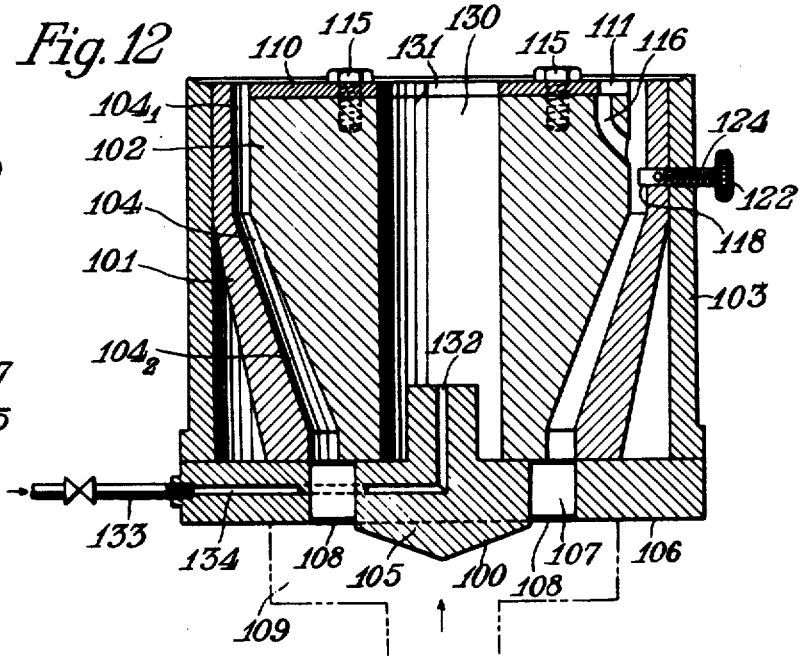
FIG. 12 is a front elevation in vertical section showing a modification of the mold.
Figure 13:
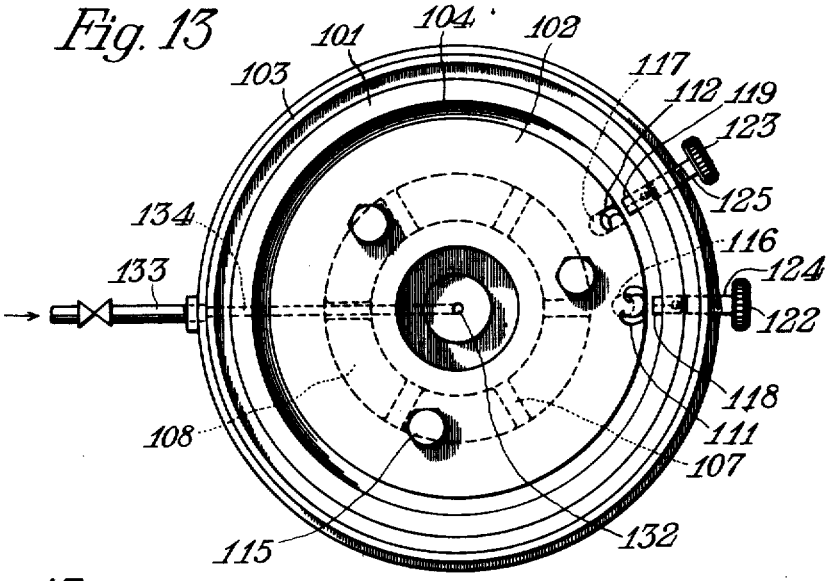
FIG. 13 is a top plan view of the above.

As shown in FIGS. 12 and 13, the outermold 101 is fitted inside a holder 103 with a core 102 in turn being fitted inside said outer mold 101 so as to form between said outer mold and core a narrow annular extrusion channel or gap 104. The top $104_1$ of the extrusion gap 104 is tubular in shape whereas the bottom $104_2$ is so constituted as to taper conically while at the same time the gap gradually widens. The bottom of the holder 103 has a central part 105 and a circumferential part 106, which by being connected together integrally by means of several connecting members 107 form the shape of a wheel. Hence, though annular openings 108, thus formed the bottom of the aforesaid extrusion gap 104 communicates with the synthetic resin feed passage 109. And with the central part 105 being fitted at its bottom with a guide facing 100 of an inverted cone shape, the material that is fed from the bottom is conducted uniformly around to the annular openings 108 to be introduced into the extrusion gap 104.

Figure 15:
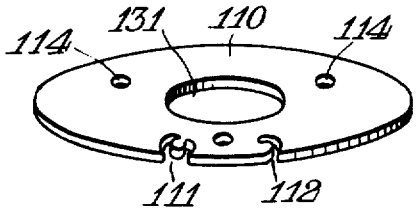
FIG. 15 is a perspective view of a molding plate having uniform talon-shaped incisions for molding the occludent means, which plate is attached to the topside of the above core.

The molding grooves for forming the occludent ribs are provided in a disk-shaped molding plate or die 110 having talon-shaped incisions 111 and 112 as shown in FIG. 15 and is attached to the upperside of the aforesaid core 102. Precisely, while the incisions 111, 112, which constitute a set of the molding grooves are incised in a part of the circumference of the molding plate 110 with the shape of the uniform talons being of a wide variety, since their positions will be determined by the size of the mold, by providing molding plates 110 of the same size having a wide variety of incisions and selectively using the same, it becomes possible to form ribs of any desired shape. For this purpose, several screw holes 113 are tapped in the upperside of the core 102, and in positions corresponding to said screw holes 113 in the molding plate are provided attaching holes 114. Thus, by screwing cap screws 115 into these holes 113, 114 the molding plate 110 is attached to the upperside of the core 102 as to be readily detachable.

Figure 14:
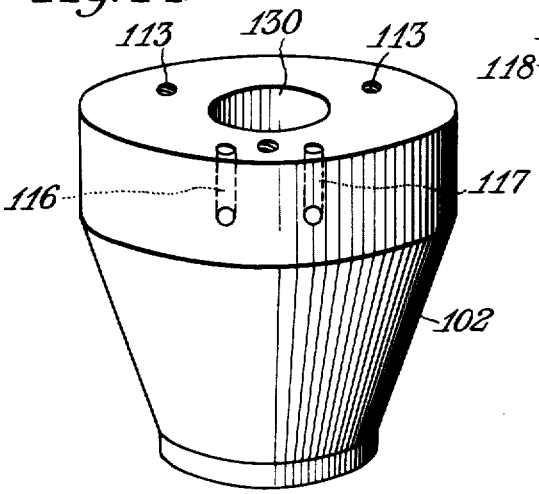
FIG. 14 is a perspective view showing a core of the above mold.
Figure 16:
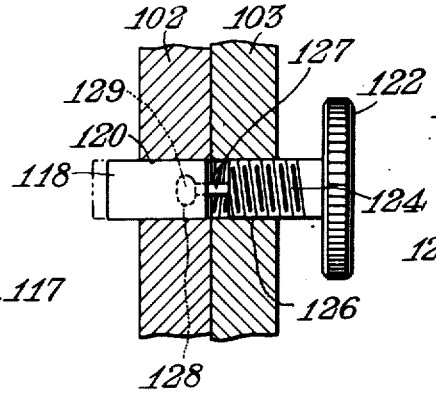
FIG. 16 is a detailed side elevation showing a resistance projection provided in the above mold.
Figure 17:
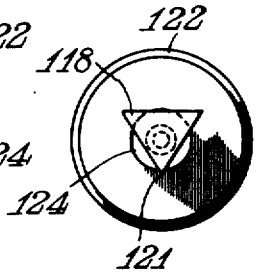
FIG. 17 is an end view of said resistance projection.

In the aforesaid core 102, as is shown in FIGS. 12–14, two passages 116, 117 are provided, the bottom end of which passages opening into the extrusion gap 104 at the side of the core and the upper end, towards the aforementioned incisions 111, 112. Slightly below these passages 116, 117 are fitted as to be freely adjustable inwards or outwards resistance projections 118, 119 having a cross-sectional face representing an inverted triangle, the tips of which protrude into the extrusion gap 104. In order to install these resistance projections 118, 119 in the above manner, first, guide holes 120 of the same shape as the above projections are provided in the side wall of the outer mold 102 in which these projections fit as shown in FIG. 16. By slidably fitting the projections in these guide holes 120, the rotation of the projections is prevented, and they are made to move in and out while maintaining the position as shown in FIG. 17 in which one of their ridges is at all times facing downwards. To the outer end of these projections adjusting screws 124, 125 provided with finger pieces 122, 123 are respectively screwed into screw holes 126 bored and tapped in the holder 103. Each of the screws 124, 125 are provided at their tips with a headed push piece 127, which in turn loosely fits into a cavity 128 wider in its interior provided in the ends of each of the resistance projections 118, 119. These resistance projections 118, 119 have been constituted thus, whereby the necessary inward or outward travel of the respective resistance projection 118 and 119 are achieved by means of the abutment of the heads 129 of the headed push pieces 127 against the end of the resistance projections 118, 119 in the cavities 128 when the adjusting screws 124, 125 are turned from the outside.

In order to make into a tubular form the bag body molded by extrusion from the above mold, air is blown in as in the case of FIG. 1 to effect the immediate swelling of the bag body, and thereafter cold air is blown against it from the outside. For this purpose, as means for feeding air into the bag body interior, holes 130, 131 of suitable size are formed in the central parts of the core 102 and the molding plate having talon-shaped incisions 110, respectively, and an air inlet 132 bored in the center of the central part 105 of the aforesaid holder is opened upwards in the center hole 130 with said air inlet 132 being made to communicate with an air feed pipe 133 connected to the circumferential part 106 by means of a duct 134 which has been provided as to pass through one of the radial connecting members 107.

The synthetic resin in a heated state that is fed from an extruder in to an apparatus as hereinabove described advances to the feed passage 108 from where it passes through the annular openings 108 and reaches the lower opening of the extrusion gap 104. Then it gradually spreads around the conical-shaped portion of the bottom $104_2$ of the extrusion gap 104 where it gradually becomes thinner as it rises and finally issues forth in a tubular shape from the upper end thereof. In the meantime, since air issues constantly from the air inlet 132, as the tubular body leaves the extrusion gap 104 the periphery thereof expands uniformly by means of the internal air pressure as to stretch the film whereupon by delivery of cold air a bag body as described hereinbefore is obtained. In this case, the resin that rises in the extrusion gap 104 of the mold upon reaching the resistance projections 118, 119 is separated by the downward facing ridges 121 and rises along the face of the projections, and at the same time a portion of the resin is continuously introduced into each of the branching passages 116, 117 where it gradually rises in these passages and is extruded through the respective incisions 111, 112. As a result, needless to say, not only is it possible to form the occludent ribs in the inside of the bag body integrally therewith, but also since by regulating the adjusting screws 124, 125 as to cause the resistance projections 118, 119 to protrude deeper into the extrusion gap 104, on account of the resistance, the amount of the resin fed to either the passage 116 or 117 is lessened as compared with the case when the projections are retracted, it becomes possible to regulate the amount of resin flowing to the incisions 111, 112 by the adjustment of the position of each of the resistance projections.

Figure 18:
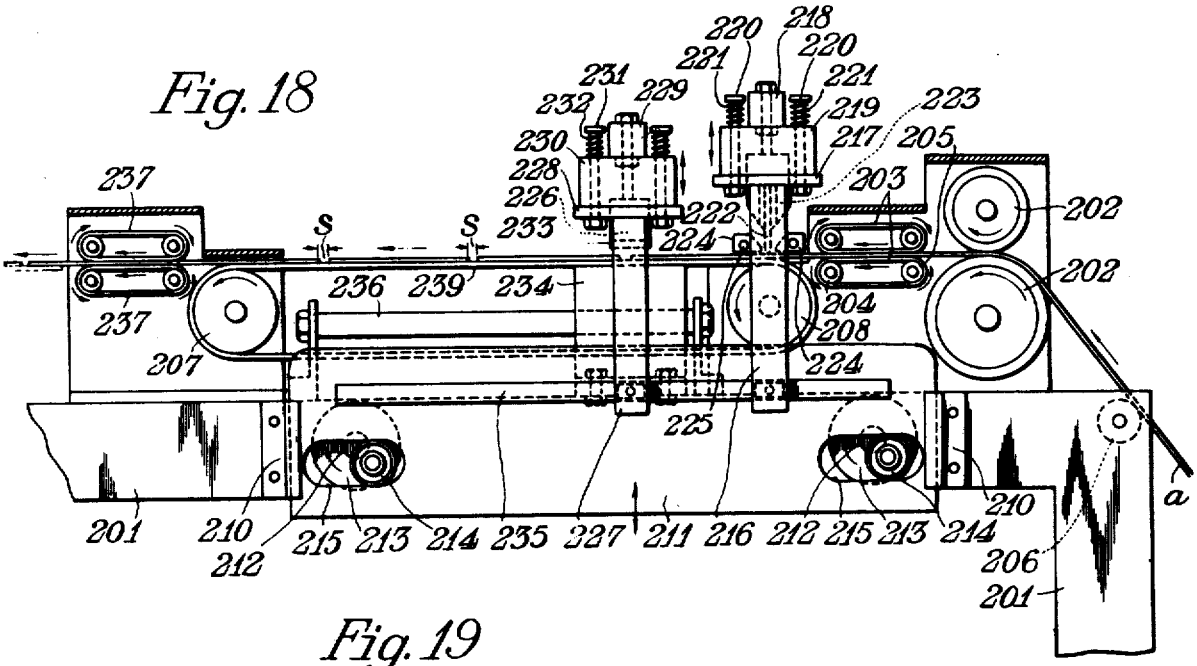
FIG. 18 is a front elevation showing an apparatus for forming from the bag body molded by the abovedescribed apparatus the individual bags by cutting said bag material to predetermined widths and simultaneously heat sealing the cut edges thereof.
Figure 19:
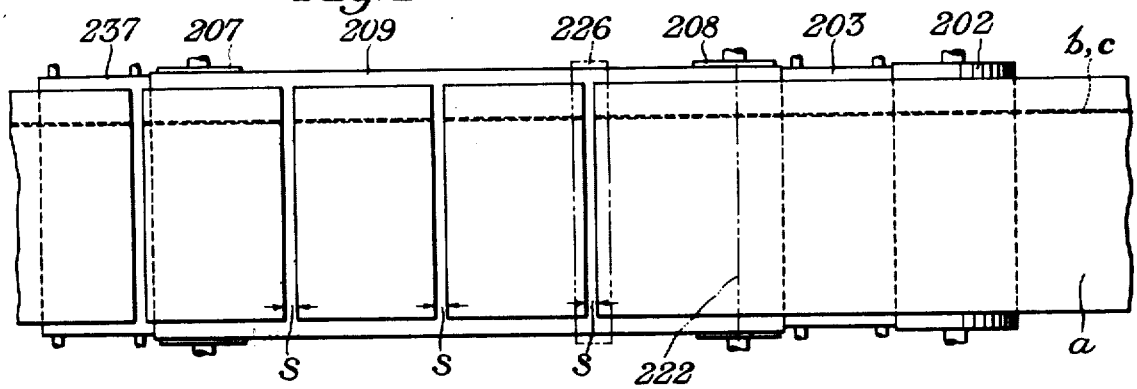
FIG. 19 is a top plan view showing the conveyor belt section thereof.
Figure 20:
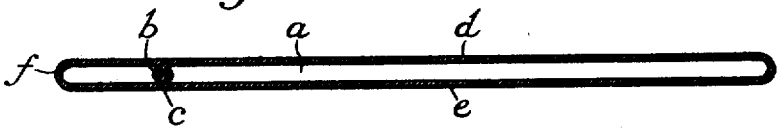
FIG. 20 is an enlarged view in section of the resultant synthetic resin bag.

Regardless of which of the hereinbefore-described molds are employed, the bag body that has been molded as described hereinbefore is then processed further in the following manner. First, by using a guide the male and female ribs that have been formed integrally in the bag body are occluded, then after flattening, to the surface of the bag body is imparted, if required, the desired printing and thereafter by using an apparatus to be described hereinafter the bag body is cut into the individual bag and simultaneously therewith the cut edges of the bags are heat sealed. The apparatus for accomplishing the cutting and heat sealing of the bags is illustrated in FIG. 18 et seq. in which: 201 is the machine frame, 202 are a pair of superposed delivery rollers disposed at one of the machine frame, while 203 are a pair of superposed belts which by means of a pair of rollers 204, 205 disposed longitudinally travel at a rate equal to the peripheral speed of the rollers 202. The flat belt-shaped bag body 6 that is to be cut is conducted via a guide roller 206 to between the superposed delivery rollers 202 while their male and female ribs 9, 10 are being maintained in an occludent state, and then by being further passed between the superposed belts 203 the delivery of the bag body is achieved continuously at a constant speed.

In a position forward of this belt 203, rollers 207, 208 are disposed longitudinally, around which an endless conveyor belt 209 is mounted. The tip of the bag body 6 which is delivered forth, as described hereinbefore, is made to be transferred smoothly from the belt 203 to the radially moving part of the conveyor belt 209. The surface of this conveyor belt 209 by being imparted a layer of such as, for example, silicon rubber is maintained so that the bag body does not stick to the surface of the conveyor belt as a result of operations such as cutting and heat sealing. In addition, by suitable determination of the rotating speed of the rollers 207, 208, the rate of travel of the conveyor belt 209 is made to be greater than that of the bag body 6. Underneath the conveyor belt 209 there is provided an elevator rack 211, which is held to the machine frame 201 by means of guide members 210 as to be capable of up-and-down movements. And by connecting this elevator rack with the delivery roller 202 through cooperatively coupled fore-and-aft rollers 214 mounted on their respective crank plates 213 provided on axles 212, which rollers 214, in turn are loosely fitted in elongated openings 215 of said elevator rack 211, this elevator rack is made to rise and fall with each rotation of the aforesaid axles 212. To this elevator rack 211 standards 216 are provided, and to a retaining plate attached to the top of said standards wing pieces 219 of a horizontal bar 218 are mounted. Two pairs of bolts 220 are freely fitted piercing the horizontal bar 218 and its wing pieces 219, and by intervening springs 221 between the head of the bolts 220 and the wing pieces 219, the horizontal bar 218 is coupled with the standards 216. Thus, when the blade 222 mounted in the horizontal bar 218 is to cut the bag body 6, the standards 216 that are held by the elevator rack 211 compresses the springs 221 and through the intervention of the bolts 220 descend somewhat more than the blade 222 as to result in the blade edge being strongly pressed in contact with the bag body 6 on account of the resilience of the spring 221. This blade 222 is disposed in the transfer section of the bag body 6, that is, in the neighborhood directly above the rear roller 208 of the conveyor belt 209, and its body proper is at all times heated to a suitable temperature by electrothermic means. For this purpose, an electrothermic means 223 is provided, which makes possible simultaneously with the cutting of the bag body the heat sealing of the cut edges. Further, also for the purpose of holding that portion along both sides of the line of cut and cooling the edges at the time of heat sealing and cutting, disposed on both sides of the edge of the blade 222 and separated therefrom by narrow gaps are provided a pair of pressure pieces 224 for the purpose of cooling capable of moving in unison with the blade 222. Water pipes 225 are connected respectively to these pressure pieces 224 for feeding cold water from one side and discharging the heated water to the other side. A pressure plate 226 is provided forward of the blade 222 at a distance equivalent to the width of one bag, the mounting of said pressure plate 226 being accomplished exactly as in the case of the aforesaid blade means. By means consisting of standards 227, a retaining plate 228, a horizontal bar 229, wing pieces 230, bolts 231 and springs 232 the pressure plate is mounted resiliently. It is desirable to provide at the lower face of the pressure plate 226 a cushion 233 such as of silicon rubber that does not stick to the cut portions of the bag material. Also, a wooden platen 234 is provided contiguous to the inner side of the conveyor plate 209 opposite the pressure plate. This pressure plate 226 and the platen 234 are so constituted as to be adjustable with regard to their positions in accordance with the width of the bag. In case of the pressure plate 226, this is made possible by providing for the lateral movement of the standards 227, which support the pressure plate 226, along a guide rail 235 of the elevator rack 211 and for securing the above standards at any optional position. On the other hand, the platen 234 can be adjusted as to its position by a lateral movement of the platen along a guide bar 236 mounted in the machine frame. Further, 237 are a set of superposed belts that have been provided forward of the conveyor belt 209 and have been provided for the purpose of removing the bags that have been conveyed by the conveyor belt 209.

In the hereinbefore described apparatus, when the delivery rollers 202 are rotated, since simultaneously with the travel of the belts 203, 237 and the conveyor belt 209, which cooperate therewith, the axles 212 rotate and the elevator rack 211 is caused to make up-and-down movements, if the bag body 6 is introduced to the delivery rollers 202 and between the belts 203, the bag body 6 is fed forward at a predetermined speed, and its tip is transferred to the top of the conveyor belt 209. Then, as the elevator rack 211 approaches the final stages of its descending movement, momentarily the traveling bag body is pressed down by the pressure pieces 224 provided for purpose of cooling and since simultaneously the bag body 6 is pressibly contacted with the blade 222, the bag body is cut by means of burning action at the line of contact of the blade while simultaneously the cut edges are closed by heat sealing at the cut edges of the top film and the bottom film. Instantly thereafter the pressure pieces 224 are provided for purpose of cooling and the blade 222 makes an ascending movement. Thus, since the pressing and cutting of the bag body 6 is completed almost instantaneously, even if in the meantime the bag body material is being continuously fed, as a matter of fact, there is no trouble caused at all. In addition, the fused material that adheres to the blade edge being burned up by itself and disappearing, the repeated use of the blade without further ado is possible without the attendance of any trouble.

When the continuous belt-like material is in this manner cut into predetermined widths starting at one end and the cut edges thereof are heat sealed, as a result of the fact that a unit width of a bag body leaves the bag body material and is placed independently upon the top of the conveyor belt 209, the cut edges become spaced apart automatically from each other for an S distance. Then, during the descent of the elevator rack 211 the cut and heat sealed edges are pressed between the pressure plate 226 descending from the top and the platen 234 disposed on the underside of the conveyor belt. Thus, inasmuch as it would be inconvenient to have unsatisfactorily heat sealed portions around that portion which is somewhat thicker than the other portions on account of the male and female ribs 9, 10 being located inside the bag body at this point, in order to preclude the possibility of such unsatisfactorily heat sealed portions to occur, pressure is applied to ensure the maintenance of a state of positive adherence of the cut edges. The bags which have been thus produced after being removed one by one from one end of the apparatus via the belts 237 and collected together are ready for use.

In using these bags, by cutting the bags at the top f and opening up the engagement of the male and female ribs, the bag is ready to be filled with whatever it is to be filled with. After the bags are filled the male and female ribs 9, 10 are again occluded, and if necessary, the mouth which was opened by cutting may be again sealed using a heat sealer.

While the invention has been described with particular reference to specific embodiments, it is to be understood that it is not to be limited thereto, but that changes may be made therein without departing from the scope of the invention which is defined in the appended claims.

Having thus set forth the nature of the invention, what is claimed is:

1. A method of manufacturing a tube to be used for forming synthetic resin bags provided with occludent means comprising, (a) a step wherein is molded continuously by passing through a mold plastic forming a tubular bag body and integrally therewith in the inside of said bag body in pairs male and female ribs for occludent use, next, (b) a step wherein air is delivered into said tubular body and said body is kept under uniform pressure, (c) tension is imparted to the tubular film between said mold and delivery rolls provided as clasping means of said tubular body, (d) cold air is delivered from a zone surrounding said tubular body during its travel to cool the film directly from the outside, and further (e) a step wherein the male and female ribs are occluded while said tubular bag body is being pressed flat.

2. The method of forming a continuous plastic tube with circumferentially spaced axially extending complementary interlocking profiles formed integrally therewith by extruding the tube through a die having an annular opening and profiles projecting therefrom comprising, (a) delivering a main flow stream of plastic to the annular opening in the die forming a tube with shaped interlocking profiles of a critical shape on the surface of the tube, (b) delivering separate flow streams of plastic to the profiles with the separate flow streams joining the main flow stream at the profiles of the die, (c) and cooling the plastc at a controlled rate to cool the tubing and the profiles.

3. The method of making a unitary container material which comprises, (a) extruding a one piece continuous closed tube having continuous axially extending *male and female interlocking* closure elements integral therewith formed at circumferentially spaced locations on the tube surface and shaped for releasably interlocking with each other with said elements each projecting from one surface only of the tube, (b) *directing a small amount of air into the tube to maintain the tube in its tubular shape,*

[ b ] *(c) directing a flow of outer cooling air annularly around the outer surface of the tube at a location where the tube has reached its final size and diameter after being extruded and after being filled with the air directed into the tube and* cooling the extruded tube at a rate so that said elements remain on the surface on which they appear and do not project on the opposite surface *and so that the closure elements are cooled retaining their shape and size,*

[(c)] *(d)* and separating the tube longitudinally between said elements.

4. The method of making a unitary container material which comprises, (a) extruding a one piece continuous closed tube of a heated plastic, (b) simultaneously extruding continuously axially extending *male and female* interlocking elements shaped for cooperative pressure interengagement and for forcible separation with one having a shaped projection and the other a shaped groove, said elements spaced apart from each other in both circumferential directions and being further apart in one direction than the other, each element projecting from its one surface only of the tube and being integral with the tube material and extending therealong, (c) *directing a small amount of air into the tube to maintain the tube in its tubular shape,*

[ (c) ] *(d)* and *directing a flow of outer cooling air annularly around the outer surface of the tube at a location where the tube has reached its final size and diameter after being extruded and after being filled with the air directed into the tube and* cooling the extruded plastic at a rate so that each of the elements remains on its one surface only and does not project from the other surface *and so that the closure elements are cooled retaining their shape and size.*

5. The method of making a unitary container material which comprises, (a) extruding a one piece continuous closed tube of a heated plastic *from an extruder head,*

(b) simultaneously extruding a continuous axially extending *male* fastener element shaped for cooperative pressure interengagement and for forcible separation with another *female* interlocking element with the element being integral with the tube and projecting from one surface only and extending therealong, (c) and *directing a flow of outer cooling air annularly around the outer surface of the tube at a location spaced axially from the extruder head* cooling the plastic after it is extruded at a rate so that the element remains on its one surface only and does not project from the other surface *and so that the closure elements are cooled retaining their shape and size.*

6. The method of making a container material for use in forming a plurality of bags which comprises, (a) extruding a continuous closed annular heated plastic tube *from an extruder head,*

(b) simultaneously extruding a plurality of pairs of continuous axially extending *male and female* interlocking elements integral with the tube and extending uniformly axially therealong with each of the interlocking elements projecting from one surface only of the tube, and

*(c) cooling the tube at a rate so that the elements remain on the surface of the tube on which they were initially formed,*

[ (c) ] *(d) directing a flow of outer cooling air annularly around the outer surface of the tube at a location spaced axially from the extruder head* cooling the plastic after it is extruded at a rate so that the elements [ remains ] *remain* on [ its ] one surface only and [ does ] *do* not project from the outer surface *and so that the closure elements are cooled retaining their shape and size,*

[ (d) ] *(e) and drawing the tube axially after it has been extruded.*

7. Apparatus for forming a stream of plastic into an annular continuous tube with circumferentially spaced axially extending interlocking means formed integrally with the tube comprising, (a) a die having an annular opening to form a tube with shaped complementary *male and female* interlocking profiles opening radially therefrom, each of said profiles projecting on its own one radial surface only of the tube, (b) means for delivering tube separating air into the tube interior, (c) means for delivering a flow of outside cooling air around the outer surface of the tube *at a location spaced axially from the die*, said air delivery means having a size and operating to cool the tube at a rate to maintain said profile on its own one radial side only of the tube *and so that the closure elements are cooled retaining their shape and size*, (d) and drawing means positioned for receiving the tube and flattening and drawing it from the die.

8. Apparatus for forming a stream of plastic into an annular continuous tube with circumferentially spaced axially extending interlocking means formed integrally with the tube comprising, (a) a die having an annular opening with shaped complementary interlocking profiles opening radially therefrom, (b) means defining an annular plastic flow channel leading to said annular die opening, (c) means delivering plastic to said flow channel, (d) a separate plastic flow passage carrying a separate stream of plastic to at least one of said profiles, (e) means for delivering a flow of outside cooling air annularly around the outer surface of the tube, (f) and drawing means positioned for receiving the tube and flattening it.

9. Apparatus for forming a stream of plastic into an annular continuous tube with circumferentially spaced axially extending interlocking means formed integrally with the tube comprising, (a) a die having an annular opening with shaped complementary interlocking profiles opening radially therefrom, (b) means defining an annular plastic flow channel leading to said annular die opening for carrying a main flow of plastic, (c) means delivering plastic to said flow channel, (d) separate plastic flow passages carrying separate streams of plastic from the main stream to the profiles, (e) means for delivering a flow of tube separating air into the tube interior, (f) means for delivering a flow of outside cooling air to the outer surface of the tube, (g) and drawing means positioned for receiving the tube and flattening it drawing it from the die.

10. Apparatus for forming a stream of plastic into an annular continuous tube with circumferentially spaced axially extending interlocking means formed integrally with the tube comprising, (a) a die having an annular opening with shaped complementary interlocking profiles opening radially therefrom, (b) means defining an annular plastic flow channel leading to said annular die opening for carrying a main flow of plastic, (c) means delivering plastic to said flow channel, (d) separate plastic flow passages carrying separate streams of plastic from the main flow to the profiles, (e) means for controlling plastic flow rate through said passages, (f) means for delivering tube separating air into the tube interior, (g) means for delivering a flow of outside cooling air around the outer surface of the tube, (h) and means positioned for receiving the tube and flattening it.

11. Apparatus for forming a stream of plastic into an annular continuous tube with circumferentially spaced axially extending interlocking means formed integrally with the tube comprising, (a) a die having an annular opening with shaped complementary interlocking profiles opening radially therefrom for extruding the tube, (b) means defining an annular plastic flow channel leading to said annular die opening for carrying a main flow of plastic, (c) means delivering plastic to said flow channel, (d) separate plastic flow passages carrying separate streams of plastic from the main flow to the profiles, (e) flow regulating projections adjustably movable into the passages individually controlling the plastic flow rate through said passages relative to the main stream, (f) means for delivering a tube inflating flow of air into the tube interior, (g) means for delivering a flow of outside cooling air around the outer surface of the tube, (h) and drawing means positioned for receiving and flattening the tube from the die.

12. Apparatus for forming a stream of plastic into an annular continuous tube with circumferentially spaced axially extending interlocking means formed integrally with the tube comprising, (a) a die having an annular opening with shaped complementary interlocking profiles opening radially therefrom, (b) means for delivering tube separating air into the tube interior after it has been extruded from the die, (c) means for delivering a flow of outside cooling air around the surface of the tube, (d) a pair of pinch rolls positioned above the die for receiving the tube and flattening it, (e) means positioned after the pinch rolls for forcing the interlocking means together, (f) and a floating guiding member within the tube below said forcing means aligning the profiles of the tube so that they are pressed together to interlock between said forcing means.

13. Apparatus for forming a stream of plastic into an annular continuous tube with circumferentially spaced axially extending interlocking means formed integrally with the tube comprising, (a) a die having an annular opening with shaped complementary interlocking profiles opening radially therefrom, (b) means defining a plastic flow channel leading to said annular die opening for carrying a main flow of plastic, (c) separate plastic flow passages carrying separate streams of plastic to the profiles, (d) flow regulating means for the passages controlling the plastic flow rate through the passages relative to said channel, (e) means for delivering a tube separating flow of air into the tube interior extruded from the die, (f) means for delivering a flow of outside cooling air around the outer surface of the tube, (g) and drawing means positioned for receiving and flattening the tube from the die.

* * * * *